United States Patent
Baldischweiler

(10) Patent No.: US 6,959,391 B1
(45) Date of Patent: Oct. 25, 2005

(54) PROTECTION OF THE CORE PART OF COMPUTER AGAINST EXTERNAL MANIPULATION

(75) Inventor: Michael Baldischweiler, Munich (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 09/926,376

(22) PCT Filed: Apr. 19, 2000

(86) PCT No.: PCT/EP00/03530

§ 371 (c)(1),
(2), (4) Date: Dec. 3, 2001

(87) PCT Pub. No.: WO00/65442

PCT Pub. Date: Nov. 2, 2000

(30) Foreign Application Priority Data

Apr. 23, 1999 (DE) ................. 199 18 620

(51) Int. Cl.[7] .................................... G06F 11/30
(52) U.S. Cl. ........................... 713/200; 714/10
(58) Field of Search ................. 711/1, 163–4; 712/2, 32, 200–203, 216; 235/346, 375, 377–382.5, 235/383–386, 435–487; 713/200; 714/10, 714/23, 51

(56) References Cited

U.S. PATENT DOCUMENTS

4,727,544 A 2/1988 Brunner et al.

FOREIGN PATENT DOCUMENTS

WO  WO 97 04394   2/1997

OTHER PUBLICATIONS

Radai, Y., "Checksumming Techniques for Anti-Viral Purposes," Virus Bulletin Conference, GB, Virus Bulletin Ltd., Abington, Sep. 1991.

*Primary Examiner*—Gregory Morse
*Assistant Examiner*—Peter Poltorak
(74) *Attorney, Agent, or Firm*—Bacon & Thomas, PLLC

(57) ABSTRACT

A method is proposed for protecting the central processing unit of a computer, in particular a smart card. Individual security-related registers are logically combined to form a check sum after the CPU has executed an instruction. The check sum is stored and compared with an accordingly formed check sum before the onset of processing of the next instruction. If the compared check sums fail to match, this indicates manipulation of the register contents of the CPU in the time period between the execution of the two instructions. In such a case a corresponding error message is issued and the processor stopped or the card confiscated.

14 Claims, 1 Drawing Sheet

PROTECTION OF THE CORE PART OF COMPUTER AGAINST EXTERNAL MANIPULATION

Figure 1:
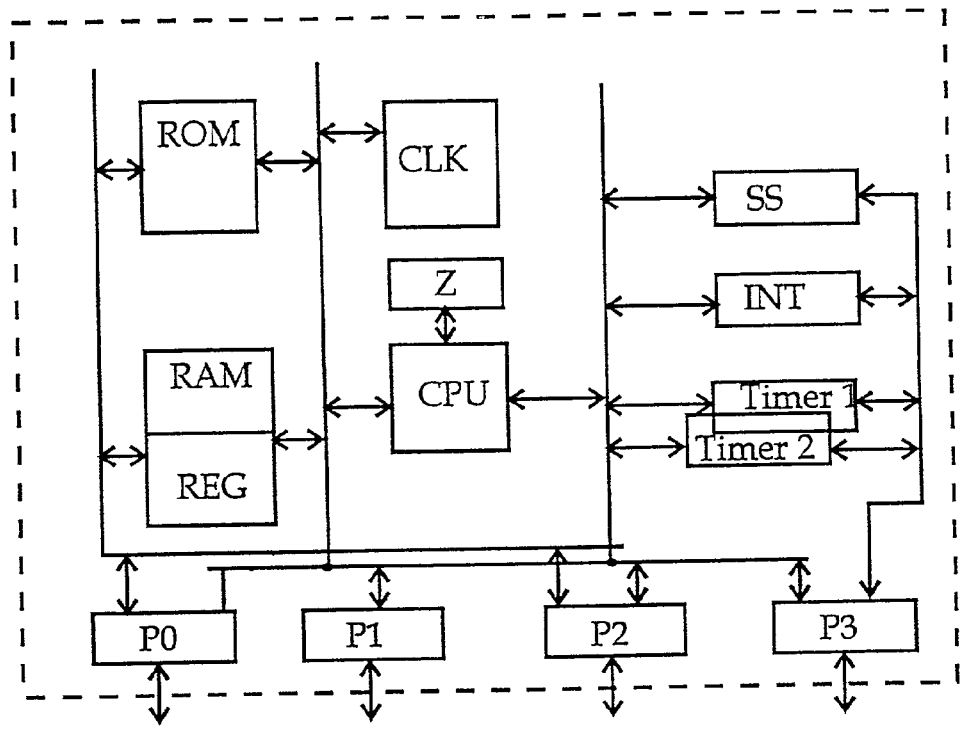

The present invention relates to the protection of a computer from external manipulation, in particular protection of the data present in the computer core or central processing unit (CPU). This invention is to be applied in particular for smart cards since they must be especially protected from manipulation from outside.

It is known to protect memory areas of a computer from manipulation for example by bus encryption, memory encryption and the like. DE 37 09 524 C2 discloses for example a test routine for checking the storage cell contents of a program memory. By forming a check sum over the storage cell contents at the onset of or during a program run and comparing it with a check sum previously stored in the program memory one can detect a change in the original storage cell contents as well as a change occurring only during operation, which leads to an error message.

The problem of the present invention is to propose a way of better protecting the computer from external manipulation.

This problem is solved according to the invention by a method, a central processing unit for carrying out said method, and a computer and smart card with such a central processing unit according to the features of the independent claims. Advantageous embodiments of the invention are stated in the subclaims.

The invention starts out from the idea of increasing the security of the computer by protecting the data present in the computer core, that is, in the central processing unit (CPU) of the computer, from external manipulation since the data are present in the computer core in unencrypted form and therefore easily manipulable.

In order to recognize such manipulation one determines a check sum from several register contents of the CPU by mathematical combination, for example by an exclusive-OR operation (XOR operation), after an instruction has been processed by the CPU and stores it in a memory as a final check sum. Before the next instruction is processed by the CPU a check sum is formed again, that is, the initial check sum. By comparing the initial check sum with the final check sum, which must match, one can ascertain whether register contents of the CPU were manipulated after the last instruction processing. As register contents one might use the contents of those areas of the CPU which can assume a nonzero state, such as in the 8051 type processor the accu, B-accu, data pointer (DPTR, DPL, DPH), registers (R0 to R7) of the register banks, program status word (PSW), stack pointer (SP), special function register (SPR) and the like.

To further increase security one can additionally, when loading an instruction, start a counter for counting the clock cycles necessary for executing the instruction. The counter is preferably constructed in terms of hardware. A logic derives from the instruction opcode the number of clock cycles necessary for execution and converts it into a counter value. The counter then runs parallel to the executed instruction. It is checked whether the instruction to be executed is executed within the stated clock cycles. In case the instruction was not executed within the predetermined time period, the clock supply is discontinued, for example, so that no further execution of instructions is possible. Alternatively a reset can be triggered and the central processing unit thus reset. The same steps can be taken if the instruction was executed prematurely, i.e. the limiting value of the instruction counter was not yet reached and a new operation code was already recognized.

The logical combination of the security-relevant registers can be realized by hardware or software. Check sum formation between two consecutive instructions can be effected for example on the basis of random or defined events or constantly.

Figure 2:
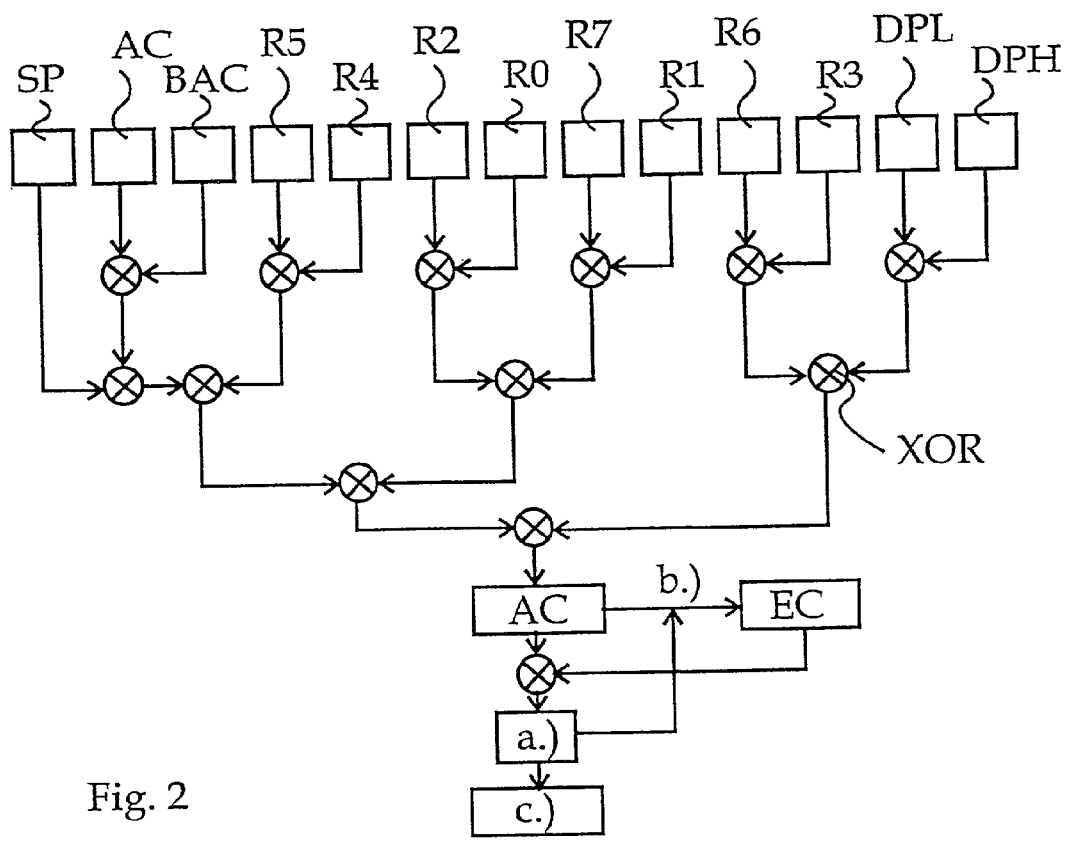

The invention will be explained in more detail in the following with reference to the drawings, in which:

FIG. 1 shows the structure of a microcontroller by the example of an 8051 processor, and FIG. 2 shows a logic for combining several areas of the central processing unit.

FIG. 1 shows the structure of an 8051 processor, that is, an 8-bit processor. While data are protected from manipulation by bus or memory encryption in known encryption methods, data are present in unencrypted form in the core of the computer, i.e. the central processing unit or CPU. The inventive method now determines whether one or more registers of the CPU have been manipulated.

FIG. 2 shows by way of example such security-relevant areas of the CPU that could be manipulated, namely stack pointer SP, accu AC, B-accu BAC, registers R0 to R7, data pointer DPL and DPH for the lower and upper areas of the internal RAM. Said registers are combined logically to form a check sum. In FIG. 2 two 8-bit registers are combined in each case by an exclusive-OR gate (XOR). Thus, XORing of registers R0 and R2 yields a new 8-bit pattern that is again XORed with the 8-bit pattern resulting from XORing of registers R1 and R7. Further XORing of the resulting 8-bit patterns finally yields an 8-bit pattern that serves as a check sum and is designated "initial check sum" in FIG. 2. Instead of XORing, which is advantageous in particular with respect to the effort, one can of course also choose other embodiments for forming the check sum.

If the combination of the registers is executed in terms of hardware by logic elements, the check sum changes immediately when the content of a register changes. That is, during execution of an instruction processed in the CPU the check sum might change many times. The only check sums crucial for carrying out the method, however, are the one after execution of an instruction and the one before execution of the next instruction since these two check sums (final check sum of one instruction and initial check sum of the next instruction) are compared in a comparer.

Comparison is performed as follows. The check sum arising at the end of execution of a first instruction is stored as the final check sum in a memory on the CPU. In order to ascertain whether manipulation of the CPU has taken place after execution of said first instruction and before loading of the next, second instruction into the CPU, the initial check sum is formed as described above parallel to the loading of said second instruction. In first step a) the initial check sum is compared by a comparer with the final check sum stored in the memory from the previously executed first instruction. In case no manipulation was performed on the CPU, the initial and final check sums match and the value of the result of comparison is zero. The comparer outputs a signal on the basis of which the currently available check sum is stored in the memory as the new final check sum in second step b) after execution of the second instruction. That is, the execution of the second instruction is not interrupted in this case. However, if comparison of the initial check sum and final check sum yields a nonzero value, manipulation of the CPU must be inferred. The output signal of the comparer then leads not to second step b) but to error message c) which causes abortion of instruction processing in the case shown in FIG. 2. For example, the processor can be stopped, a security sensor activated or, in the case of a smart card, the smart card withheld by the terminal.

The above-described security mechanism can also be realized strictly in terms of software by the check sums being determined at the end of an instruction execution, on the one hand, and at the onset of the next instruction execution, on the other hand, and compared. The corresponding program can be stored for example in the ROM or EPROM of the processor and the final check sum stored in the bit-addressable RAM of the processor.

The described method need not be performed before each instruction to be executed. One embodiment of the invention provides for the carrying out of the method to depend on a random or defined event. According to a first embodiment, the method can be triggered in time-dependent fashion.

According to another embodiment, the method can be triggered by the content of one or more registers of the CPU corresponding to a predetermined pattern.

Yet another embodiment of the invention provides for the method to be triggered after processing of a predetermined number of instructions in each case.

A preferred embodiment is one by which the method is only triggered if there is a relatively long, defined time period between the instruction after whose execution the check sum was stored as the final check sum in the memory and the initial check sum at the onset of execution of the next instruction. This saves valuable computer capacity in execution of a program with many instructions. Assuming that manipulation of the CPU, in particular with smart cards, does not take place during the program run but when the smart card is removed from the smart card terminal, manipulation of the CPU is nevertheless reliably detectable by means of this latter described embodiment.

What is claimed is:

1. A method for protecting a computer with a central processing unit (CPU) and a clock signal supply providing a clock signal to the CPU from external manipulation, comprising the steps of:
   determining a final check sum by mathematical combination with reference to register contents of the CPU arising at the end of processing of an instruction by the CPU,
   storing the final check sum, and
   determining an initial check sum with reference to the register contents arising before the onset of processing of the next instruction by the CPU, and creating an error message if the initial check sum does not match the final check sum.

2. The method according to claim 1, wherein upon loading of the instruction a counter is started for counting clock cycles necessary for executing the instruction and outputting an error signal when the predetermined clock cycles are overshot or undershot.

3. The method according to claim 2, wherein the error signal triggers an interrupt or leads to discontinuance of the clock signal supply.

4. The method according to claim 2, wherein the number of clock cycles necessary for executing an instruction is derived from the opcode of the instruction by a logic circuit.

5. The method according to claim 1, wherein the mathematical combination takes place by means of exclusive-OR combination of the register contents.

6. The method according to claim 1, wherein the initiation of the method is triggered by random or defined events.

7. The method according to claim 6, wherein the method is triggered in time-dependent fashion.

8. The method according to claim 6, wherein the method is triggered when the content of one or more registers of the CPU corresponds to a predetermined pattern.

9. The method according to claim 6, wherein the method is triggered after processing of a predetermined number of instructions.

10. A central processing unit (CPU) for a computer for carrying out the method according to claim 1, comprising:
    a combination of several registers of the CPU by logic elements to form a check sum,
    a check sum memory for storing a first check sum determined by the logic elements,
    a comparer for comparing a second check sum determined by the logic elements with the first check sum stored in the memory, and
    a control device for controlling the storage of the first check sum in the check sum memory and for controlling the comparer.

11. The central processing unit according to claim 10, including a counter for counting the clock cycles required for an instruction execution.

12. The central processing unit according to claim 10, including a logic circuit arranged to determine from the opcode of the instruction the clock cycles necessary for executing an instruction.

13. A computer comprising a central processing unit made according to claim 10.

14. A smart card comprising a central processing unit made according to claim 10.

* * * * *